US010614585B2

(12) United States Patent
Ohara et al.

(10) Patent No.: US 10,614,585 B2
(45) Date of Patent: Apr. 7, 2020

(54) PARALLAX CALCULATION APPARATUS, STEREO CAMERA APPARATUS, VEHICLE, AND PARALLAX CALCULATION METHOD

(71) Applicant: KYOCERA Corporation, Kyoto (JP)

(72) Inventors: Naoto Ohara, Yokohama (JP); Kenji Kono, Yokohama (JP); Kazumasa Akimoto, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/746,334

(22) PCT Filed: Jul. 29, 2016

(86) PCT No.: PCT/JP2016/003522
§ 371 (c)(1),
(2) Date: Jan. 19, 2018

(87) PCT Pub. No.: WO2017/017963
PCT Pub. Date: Feb. 2, 2017

(65) Prior Publication Data
US 2018/0225838 A1 Aug. 9, 2018

(30) Foreign Application Priority Data

Jul. 29, 2015 (JP) ................... 2015-150072

(51) Int. Cl.
*G06T 7/593* (2017.01)
*G06T 1/00* (2006.01)
(Continued)

(52) U.S. Cl.
CPC ............... *G06T 7/593* (2017.01); *G01C 3/14* (2013.01); *G06T 1/00* (2013.01); *G01C 3/085* (2013.01); *G06T 2207/10012* (2013.01)

(58) Field of Classification Search
CPC . G06T 7/593; G06T 1/00; G06T 2207/10012; G01C 3/14; G01C 3/085
See application file for complete search history.

(56) References Cited

U.S. PATENT DOCUMENTS 5,116,118 A 5/1992 Jones
9,607,406 B2 * 3/2017 Hata ...................... G01B 11/02
(Continued)

FOREIGN PATENT DOCUMENTS

JP 2000-207695 A 7/2000
JP 2001-126065 A 5/2001
(Continued)

OTHER PUBLICATIONS

International Search Report issued in PCT/JP2016/003522; dated Oct. 18, 2016.
(Continued)

*Primary Examiner* — Mia M Thomas
(74) *Attorney, Agent, or Firm* — Studebaker & Brackett PC

(57) ABSTRACT

A parallax calculation apparatus (12) includes an input interface (15) configured to acquire a stereo image including a first image and a second image and a controller (16) configured to calculate parallax by performing sequential matching of a block that is a portion of the second image with the first image while sequentially shifting the block from an initial position in a baseline length direction. The controller (16) varies the pitch at which the block is shifted next in accordance with the shift amount of the block from the initial position.

7 Claims, 10 Drawing Sheets

(51) Int. Cl.
*G01C 3/14* (2006.01)
*G01C 3/08* (2006.01)

(56) References Cited

U.S. PATENT DOCUMENTS

| | | | | |
|---|---|---|---|---|
| 10,009,594 | B2* | 6/2018 | Nanri | G01B 11/026 |
| 10,019,816 | B2* | 7/2018 | Venkataraman | G06T 7/596 |
| 10,080,012 | B2* | 9/2018 | McNamer | H04N 13/261 |
| 2006/0114320 | A1* | 6/2006 | Nagaoka | G06T 7/85 |
| | | | | 348/118 |
| 2012/0327189 | A1* | 12/2012 | Muramatsu | G01C 3/06 |
| | | | | 348/46 |
| 2014/0009463 | A1* | 1/2014 | Watanabe | H04N 13/315 |
| | | | | 345/419 |
| 2015/0187091 | A1* | 7/2015 | Hata | G01B 11/02 |
| | | | | 382/101 |
| 2018/0167605 | A1* | 6/2018 | Cui | G06T 7/593 |
| 2018/0315208 | A1* | 11/2018 | Ohara | G01C 3/06 |
| 2019/0182467 | A1* | 6/2019 | Hamilton | G06K 9/00791 |
| 2019/0213481 | A1* | 7/2019 | Godard | G06F 17/16 |

FOREIGN PATENT DOCUMENTS

| | | |
|---|---|---|
| JP | 2006-318061 A | 11/2006 |
| JP | 2008-304202 A | 12/2008 |
| JP | 2011-013064 A | 1/2011 |
| JP | 2013-174494 A | 9/2013 |

OTHER PUBLICATIONS

Written Opinion issued in PCT/JP2016/003522; dated Oct. 18, 2016.

* cited by examiner

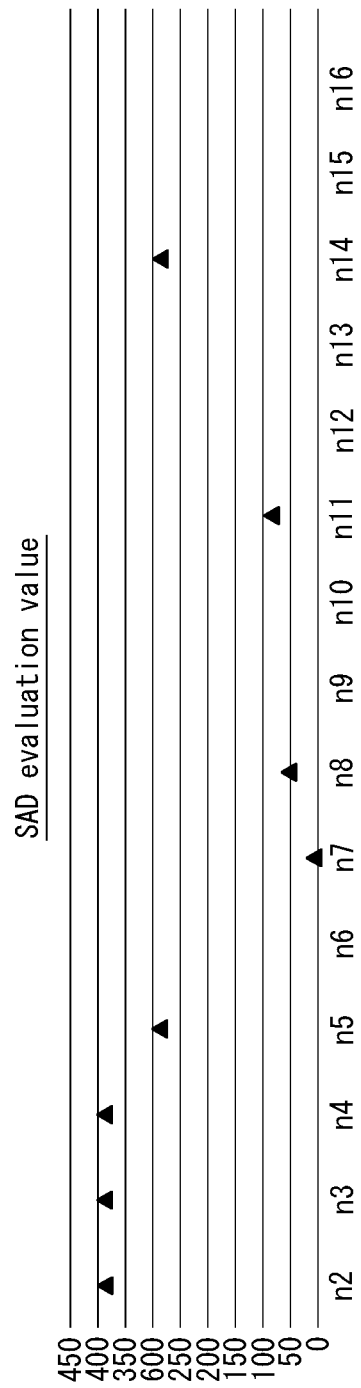

PARALLAX CALCULATION APPARATUS, STEREO CAMERA APPARATUS, VEHICLE, AND PARALLAX CALCULATION METHOD

CROSS-REFERENCE TO RELATED APPLICATION

The present application claims priority to and the benefit of Japanese Patent Application No. 2015-150072 filed Jul. 29, 2015, the entire contents of which are incorporated herein by reference.

TECHNICAL FIELD

The present disclosure relates to a parallax calculation apparatus, a stereo camera apparatus, a vehicle, and a parallax calculation method.

BACKGROUND

Stereo camera apparatuses that measure the distance to a subject using a plurality of cameras are being used in vehicles.

Methods are known for detecting a three-dimensional object and measuring distance with a stereo camera by calculating the parallax at each position on the image (for example, see patent literature (PTL) 1). In such methods, a benchmark image (first image) and a reference image (second image) are captured by a stereo camera. The second image is divided into multiple blocks (small areas) measuring approximately three to nine pixels in each of the horizontal and vertical directions. Each block of the divided second image is sequentially shifted in a baseline length direction (a direction spanning the distance between the optical axes of the two cameras in the stereo camera) at a uniform pitch (for example, one pixel at a time) relative to the first image. Matching with the first image is performed on the block of the second image at each shift. Matching is performed by comparing the luminance or color pattern of the pixels in the block of the second image with the corresponding pixels in the first image. For example, when matching by luminance, the sum of the absolute value of the difference in luminance between corresponding pixels is calculated, and the shift amount that minimizes the sum is determined to be the parallax. This matching process can be executed by a dedicated hardware circuit. Using the principle of triangulation, the distance Z to an object of detection imaged in a block can be calculated with the following equation, where d is the parallax obtained in the above way, b is the baseline length of the two cameras, and f is the focal length of the cameras.

$$Z = b \cdot f / d \quad (1)$$

The parallax decreases at long distances and increases at short distances. At long distances, the change in parallax is small relative to a change in distance. At short distances, the change in parallax is large relative to a change in distance. Therefore, the blocks of the second image need to be shifted repeatedly on the first image during image matching between the first image and the second image at short distances. Accordingly, if parallax calculation for a target at an extremely short distance is to be accommodated, the amount of calculation and the processing time increase. Typically, a short distance measurement limit is therefore set to ensure the processing capability of the apparatus, and parallax measurement is not possible at closer positions.

Therefore, the stereo camera apparatus disclosed in PTL 1 includes a determining means for determining whether a three-dimensional object exists closer than the distance of the detectable measurement limit by using the detection result for three-dimensional objects in the previous frame. In other words, the stereo camera apparatus disclosed in PTL 1 determines that a three-dimensional object is likely to be positioned at a shorter distance than the measurement limit when a three-dimensional object that was positioned at the short distance measurement limit in the immediately prior measurement is no longer detected in the current measurement. In this case, the stereo camera apparatus extracts a characteristic portion, for example a portion with a large change in luminance, and uses a software program provided for short distance measurement to perform matching of the first image and the second image apart from the regular matching of the first image and the second image. In this manner, the stereo camera apparatus detects the distance up to a three-dimensional object.

CITATION LIST

Patent Literature

PTL 1: JP 2000-207695 A

SUMMARY

Solution to Problem

A parallax calculation apparatus according to an embodiment includes an input interface and a controller. The input interface is configured to acquire a stereo image including a first image and a second image. The controller is configured to calculate parallax by performing sequential matching of a block that is a portion of the second image with the first image while sequentially shifting the block from an initial position in a baseline length direction. The controller varies a pitch at which the block is shifted next in accordance with a shift amount of the block from the initial position.

A stereo camera apparatus according to an embodiment includes a stereo camera and a parallax calculation apparatus. The parallax calculation apparatus includes an input interface and a controller. The input interface is configured to acquire a stereo image including a first image and a second image captured by the stereo camera. The controller is configured to calculate parallax by performing sequential matching of a block that is a portion of the second image with the first image while sequentially shifting the block from an initial position in a baseline length direction. The controller varies a pitch at which the block is shifted next in accordance with a shift amount of the block from the initial position.

A vehicle according to an embodiment includes a stereo camera apparatus. The stereo camera apparatus includes a stereo camera and a parallax calculation apparatus. The parallax calculation apparatus includes an input interface and a controller. The input interface is configured to acquire a stereo image including a first image and a second image captured by the stereo camera. The controller is configured to calculate parallax by performing matching of a block that is a portion of the second image with the first image while sequentially shifting the block from an initial position in a baseline length direction. The controller varies a pitch at which the block is shifted next in accordance with a shift amount of the block from the initial position.

A parallax calculation method according to an embodiment acquires a stereo image including a first image and a second image captured by a stereo camera. The parallax calculation method calculates parallax by performing sequential matching of a block that is a portion of the second image with the first image while sequentially shifting the block from an initial position in a baseline length direction. The parallax calculation method varies a pitch at which the block is shifted next in accordance with a shift amount of the block from the initial position.

BRIEF DESCRIPTION OF THE DRAWINGS

In the accompanying drawings:

FIG. 6C illustrates an example of the change in the evaluation value when varying the pitch for shifting a one-dimensional block in accordance with the shift number of the block in the present embodiment;

DETAILED DESCRIPTION

An embodiment of the present disclosure is described below with reference to the drawings.

Figure 1:
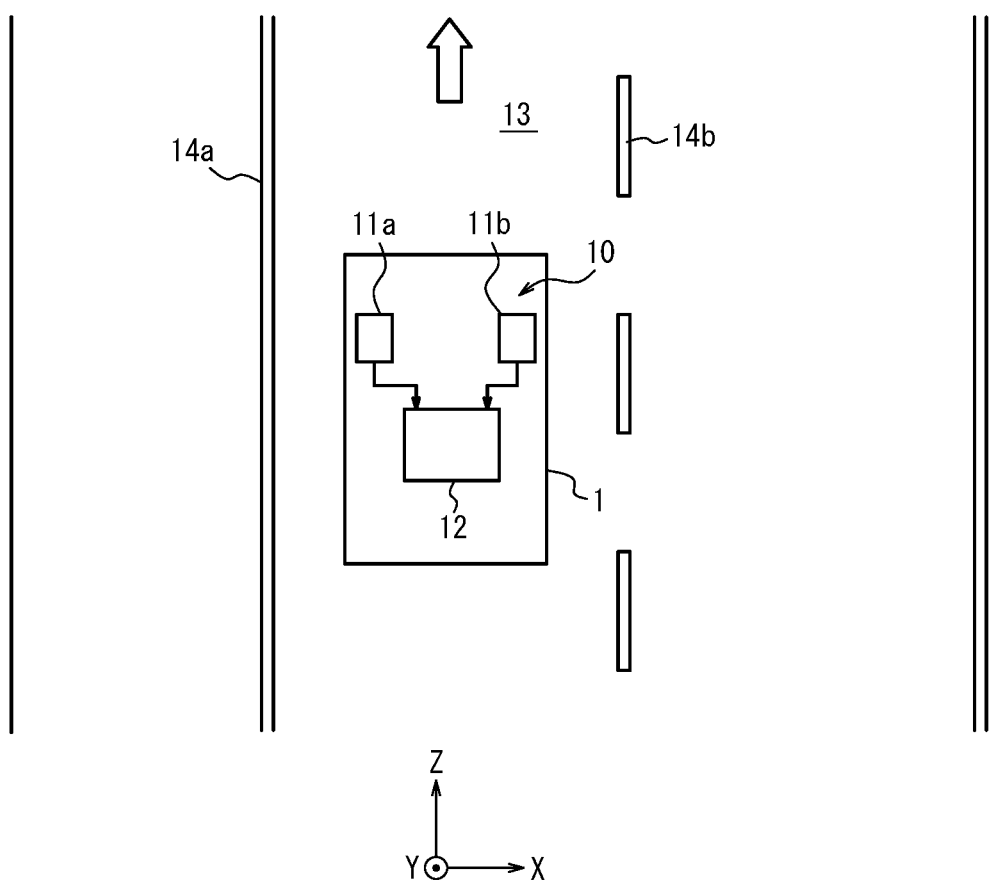
FIG. 1 is a simplified view of a vehicle that is equipped with a stereo camera apparatus and is traveling on a road.

In FIG. 1, the direction of travel of the vehicle 1 (upward in FIG. 1) is referred to as the positive Z-direction, the direction that is in the vehicle width direction of the vehicle 1 (the horizontal direction in FIG. 1) and points from left to right is referred to as the positive X-direction, and the direction from the ground towards the sky is referred to as the positive Y-direction. Here, the term "vehicle" in the present disclosure includes, but is not limited to, automobiles, railway vehicles, industrial vehicles, and vehicles for daily life. For example, the term "vehicle" may include airplanes that travel down a runway. Automobiles include, but are not limited to, passenger vehicles, trucks, buses, motorcycles, trikes, and trolley buses, and may include other vehicles that drive on the road. Railway vehicles include, but are not limited to, locomotives, freight cars, passenger cars, streetcars, guided railway vehicles, ropeways, cable cars, linear motor cars, and monorails, and may include other vehicles that travel along a track. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. Vehicles for daily life include, but are not limited to, bicycles, wheelchairs, baby carriages, wheelbarrows, and motorized, two-wheeled standing vehicles. Power engines for the vehicle include, but are not limited to, internal-combustion engines including diesel engines, gasoline engines, and hydrogen engines, and electrical engines including motors. The term "vehicle" includes man-powered vehicles. The vehicle is not limited to the above-listed types. For example, automobiles may include industrial vehicles that can drive on the road, and the same vehicle may be included in multiple categories.

The stereo camera apparatus 10 includes a stereo camera 11 and a parallax calculation apparatus 12 connected electrically to the stereo camera 11. The stereo camera 11 is configured to include two cameras, a first camera 11a positioned to the left and a second camera 11b positioned to the right in the direction of travel (Z-direction).

Here, a "stereo camera" refers to a plurality of cameras that have mutual parallax and that work together. The stereo camera includes at least two cameras. The stereo camera can cause the plurality of cameras to work together to image an object from a plurality of directions. Apparatuses that can cause a plurality of cameras to work together to image a subject simultaneously are encompassed by the term "stereo camera". "Simultaneous" imaging is not limited to the exact same time. For example, the "simultaneous" imaging as used in the present disclosure includes (1) the plurality of cameras capturing images at the same time, (2) the plurality of cameras capturing images in response to the same signal, and (3) the plurality of cameras capturing images at the same time according to respective internal clocks. The start time of imaging, the end time of imaging, the transmission time of captured image data, and the time at which the other device receives image data are examples of the reference time at which imaging may be considered to occur. The stereo camera may be a device that includes a plurality of cameras in a single housing. The stereo camera may also be a device that includes two or more independent cameras positioned apart from each other. The stereo camera is not limited to a plurality of independent cameras. In the present disclosure, a camera having an optical mechanism that guides light incident at two separate locations to one optical detector, for example, may be adopted as the stereo camera. The two independent cameras, i.e. the first camera 11a and the second camera 11b, are arranged side-by-side in the stereo camera apparatus 10. In the present disclosure, a plurality of images of the same subject captured from different viewpoints is also referred to as a "stereo image".

The first camera 11a and the second camera 11b each include an image sensor. The image sensor includes a charge-coupled device (CCD) image sensor or a complementary MOS (CMOS) image sensor. The first camera 11a and the second camera 11b may include a lens mechanism. The optical axes of the first camera 11a and the second camera 11b are oriented in directions in which the same target can be imaged. The optical axes of the first camera 11a and the second camera 11b differ from each other. The optical axes and the positions of the first camera 11a and the second camera 11b are determined so as to include at least the same target in the captured images. The optical axes of the first camera 11a and the second camera 11b are oriented to be parallel to each other. The term "parallel" here is not limited to strict parallelism and includes tolerance for misalignment upon assembly, misalignment upon attachment, and misalignment over time. The optical axes of the first camera 11a and the second camera 11b are not limited to being parallel to each other and may be oriented in different directions. The first camera 11a and the second camera 11b are fixed to the body of the vehicle 1 to reduce variation in the position and the orientation relative to the vehicle 1. Even when fixed in place, the first camera 11a and the second camera 11b may change in position or orientation relative to the vehicle 1. The optical axes of the first camera 11a and the second camera 11b may be oriented towards the front (Z-direction) of the vehicle 1. While the vehicle is traveling, the stereo camera apparatus 10 can image various subjects, such as white lines 14a, 14b, a vehicle in front, an obstacle, and the like on a road 13. The optical axes of the first camera 11a and the second camera 11b may be inclined from the Z-direction towards the road 13. The optical axes of the first camera 11a and the second camera 11b may be oriented in the Z-direction or may be inclined towards the sky from the Z-direction. The optical axes of the first camera 11a and the second camera 11b are modified appropriately for the intended use. The first camera 11a and the second camera 11b are positioned apart from each other in a direction that crosses the optical axes. In an embodiment, the first camera 11a and the second camera 11b are positioned along the vehicle width direction (X-direction) of the vehicle 1. The first camera 11a is positioned on the left side of the second camera 11b when facing forward, and the second camera 11b is positioned on the right side of the first camera 11a when facing forward. Because of the difference in positions of the first camera 11a and the second camera 11b, a corresponding subject appears at different positions in two captured images. The image output from the first camera 11a and the image output from the second camera 11b are a stereo image captured from different viewpoints. The distance between the optical axes of the first camera 11a and the second camera 11b may be referred to as the baseline length. The direction along the baseline length of the first camera 11a and the second camera 11b may be referred to as the baseline length direction. Accordingly, the baseline length direction in the present embodiment is the X-direction. The direction on the stereo image corresponding to the baseline length direction in real space is also referred to as the baseline length direction. The baseline length direction is the direction in which parallax occurs.

In an embodiment, the optical axes of the first camera 11a and the second camera 11b are oriented in the direction ahead of the vehicle 1 (the Z-direction) and are fixed at the front of the vehicle 1. In an embodiment, the first camera 11a and the second camera 11b can image the outside of the vehicle 1 through the windshield of the vehicle 1. In an embodiment, the first camera 11a and the second camera 11b may be fixed to one of the front bumper, the fender grills, the side fenders, the light modules, and the hood (bonnet) of the vehicle 1.

In the present embodiment, the image captured by the first camera 11a is referred to as the first image. The image captured by the second camera 11b is referred to as the second image. The first image is a benchmark image. The second image is a reference image. The parallax of the second image relative to the first image is calculated below. Cameras with the same specifications may be used as the first camera 11a and the second camera 11b. The first camera 11a and the second camera 11b may have different specifications. The stereo camera apparatus 10 may capture the benchmark image with the second camera 11b and the reference image with the first camera 11a.

The first camera 11a and the second camera 11b output the respective captured images as digital data to the parallax calculation apparatus 12 provided within the vehicle 1. The parallax calculation apparatus 12 may calibrate at least one of the first image output by the first camera 11a and the second image output by the second camera 11b. The parallax calculation apparatus 12 can calculate the parallax of a subject in the image. The parallax calculation apparatus 12 can transmit and receive information to and from another information processing apparatus in the vehicle 1 over a network, such as a controller area network (CAN).

Figure 2:
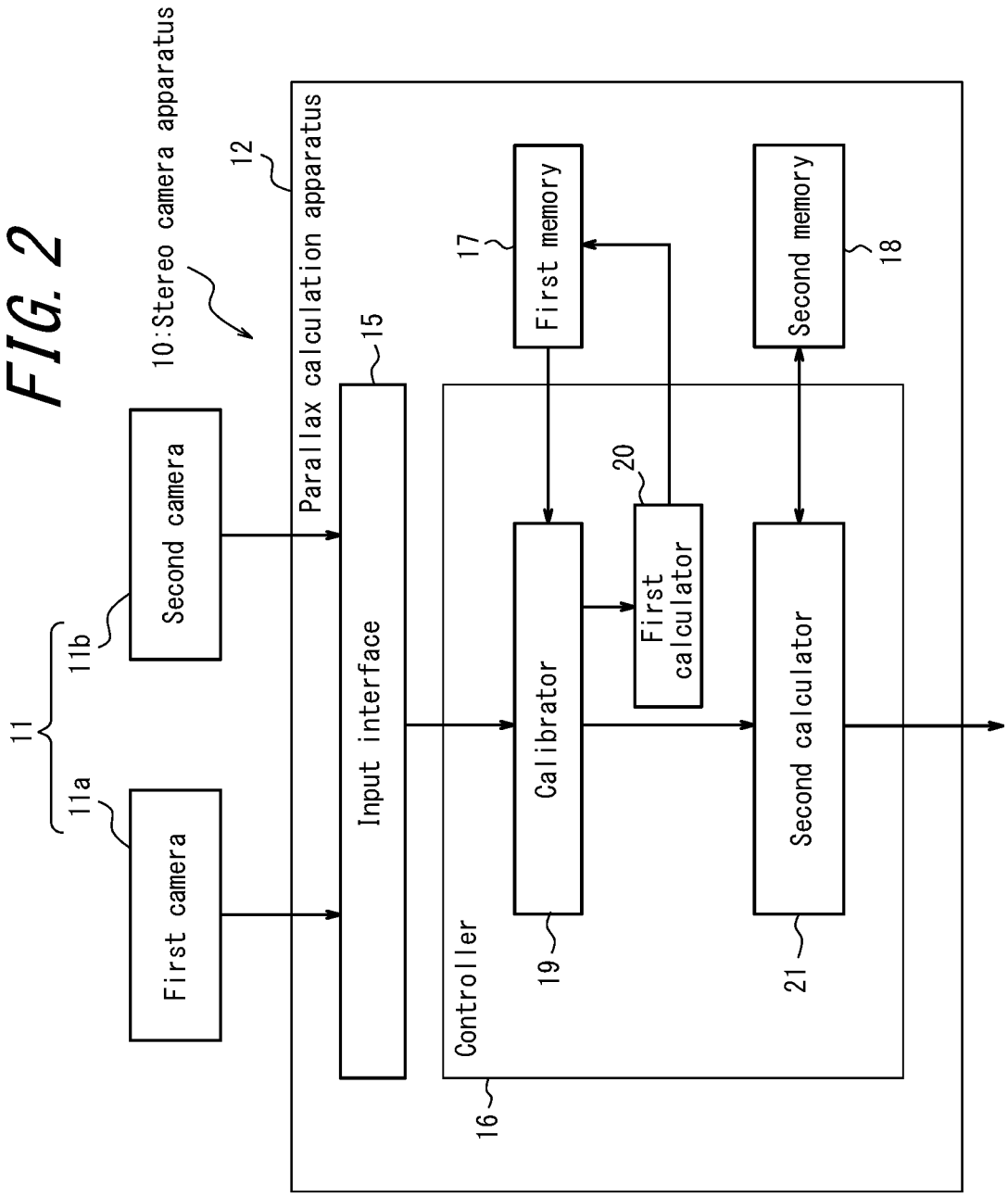
FIG. 2 is a block diagram illustrating the configuration of a stereo camera apparatus according to an embodiment of the present disclosure.

As illustrated in FIG. 2, the stereo camera apparatus 10 includes the stereo camera 11, which includes the first camera 11a and the second camera 11b, and the parallax calculation apparatus 12. The parallax calculation apparatus 12 includes an input interface 15, a controller 16, a first memory 17, and a second memory 18.

The input interface 15 is an input interface for inputting image data to the parallax calculation apparatus 12. A physical connector or a wireless communication device can be used in the input interface 15. Physical connectors include an electrical connector corresponding to transmission by an electric signal, an optical connector corresponding to transmission by an optical signal, and an electromagnetic connector corresponding to transmission by an electromagnetic wave. Electrical connectors include connectors conforming to IEC 60603, connectors conforming to the USB standard, connectors comprising RCA terminals, connectors comprising S terminals prescribed by EIAJ CP-1211A, connectors comprising D terminals prescribed by EIAJ RC-5237, connectors conforming to the HDMI® standard (HDMI is a registered trademark in Japan, other countries, or both), and connectors comprising a coaxial cable including a BNC connector. Optical connectors include a variety of connectors conforming to IEC 61754. Wireless communication devices include wireless communication devices conforming to standards that include Bluetooth® (Bluetooth is a registered trademark in Japan, other countries, or both) and IEEE802.11. The wireless communication device includes at least one antenna. The input interface 15 can receive input of image data captured by the first camera 11a and the second camera 11b. Input to the input interface 15 may correspond to the transmission method of an image signal in the stereo camera 11. The input interface 15 receives the first image and the second image respectively from the first camera 11a and the second camera 11b. Furthermore, the input interface 15 delivers the received images to a calibrator 19 of the controller 16.

The controller 16 is a component that executes various calculation processing of the parallax calculation apparatus 12. The controller 16 includes one or more processors. The controller 16 or the processor may include one or more memories that store programs for various processing and store information during calculations. The term "memory" encompasses volatile memory and non-volatile memory. The memory may be configured as a memory independent from the processor and/or a memory embedded in the processor. The term "processor" encompasses universal processors that execute particular functions by reading particular programs and dedicated processors that are specialized for particular processing. Dedicated processors include application specific integrated circuits (ASICs) for a specific application. Processors include programmable logic devices (PLDs). PLDs include field-programmable gate arrays (FPGAs). The controller 16 may be either a system-on-a-chip (SoC) or a system in a package (SiP) with one processor or a plurality of processors that work together. The controller 16 is configured to encompass functional blocks such as the calibrator 19, a first calculator 20, and a second calculator 21.

The first memory 17 is a rewritable memory for storing calibration parameters used by the calibrator 19. The first memory 17 can, for example, be a non-volatile memory such as a flash memory, a magnetoresistive random access memory (MRAM), a ferroelectric random access memory (FeRAM), or the like. The first memory 17 may be a memory embedded in the controller 16 or the processor included in the controller 16.

The second memory 18 is a memory for temporarily accumulating the first image and the second image that were calibrated by the calibrator 19. A high-speed, volatile memory such as a dynamic random access memory (DRAM) or a synchronous dynamic random access memory (SDRAM) may be used as the second memory 18. During the processing of one frame, the second memory 18 stores the parallax of each block output from the second calculator 21 while retaining the first image and the second image. Once processing of one frame is complete, the first image, the second image, and the parallax accumulated in the second memory 18 are output by the second calculator 21. The second memory 18 may be a memory embedded in the controller 16 or the processor included in the controller 16. The second memory 18 may be configured as one device together with the first memory 17. When the first memory 17 and the second memory 18 are one device, the first memory 17 and the second memory 18 may share at least a part of their memory areas. The first memory 17 and the second memory 18 may be different memory areas within one device.

The operations of the controller 16 according to an embodiment are further described. In an embodiment, the controller 16 encompasses the functional blocks of the calibrator 19, the first calculator 20, and the second calculator 21. The operations of each component are described below. Each functional block may be a hardware module or a software module. The operations that can be performed by each functional block can be executed by the controller 16. The controller 16 is not limited to an embodiment including the calibrator 19, the first calculator 20, and the second calculator 21, and one or more functional blocks may be omitted. In an embodiment, the controller 16 may execute the operations of all of the functional blocks. The operations performed by each functional block may be synonymous with operations performed by the controller 16. The controller 16 itself may execute the processing that the controller 16 causes any of the functional blocks to perform. Any recitation related to hardware in the functional blocks of the controller 16 may be interpreted as a recitation related to hardware of the controller 16.

The calibrator 19 calibrates the images received from the first camera 11a and second camera 11b by referring to the calibration parameters stored in the first memory 17. The calibrator 19 electronically calibrates a misalignment from a standard in each of the first camera 11a and second camera 11b by data conversion of the images. This calibration may include electronically calibrating the misalignment between the first camera 11a and second camera 11b by image conversion within the calibrator 19. The misalignment between the first camera 11a and second camera 11b may include an error due to manufacturing accuracy of the stereo camera apparatus 10, misalignment occurring during manufacturing of the stereo camera apparatus 10, misalignment occurring upon attachment to the vehicle 1, or misalignment caused by external vibration, shock, or the like. By electronic calibration, the calibrator 19 converts the first image and the second image to images that are parallel and at the same level.

The first calculator 20 compares the first image and the second image received from the first camera 11a and the second camera 11b. The first calculator 20 calculates calibration parameters for the first camera 11a and the second camera 11b on the basis of the comparison of the first image and the second image. The first calculator 20 updates the calibration parameters stored in the first memory 17 to the calculated calibration parameters. For example, the first calculator 20 detects two parallel white lines in the images of the first camera 11a and the second camera 11b. The first calculator 20 calculates calibration parameters to cause the coordinate positions of the vanishing point of the detected white lines to match. The first calculator 20 need not always be in operation. The first calculator 20 may operate intermittently. For example, the first calculator 20 may update the calibration parameters at fixed time intervals or automatically at times such as when white lines are first detected after the parallax calculation apparatus 12 is activated.

The second calculator 21 uses the first image and the second image that were calibrated by the calibrator 19. The first image and second image after calibration by the calibrator 19 are also referred to simply as the first image and the second image. The first image and the second image may, depending on circumstances, be synonymous with the first or second image before calibration or as the first or second image after calibration. The second calculator 21 divides the second image into blocks and calculates the parallax from the first image for each block. The block may have a rectangular shape. To calculate parallax, the second calculator 21 shifts the block of the second image sequentially in the baseline length direction and performs one-dimensional matching with the first image. The matching is performed on the basis of one or more of luminance, color, and the like. The elements used for matching may be replaced by other elements. The second calculator 21 may be provided with a dedicated parallel processing calculation circuit for performing matching between the first image and second image.

Figure 3:
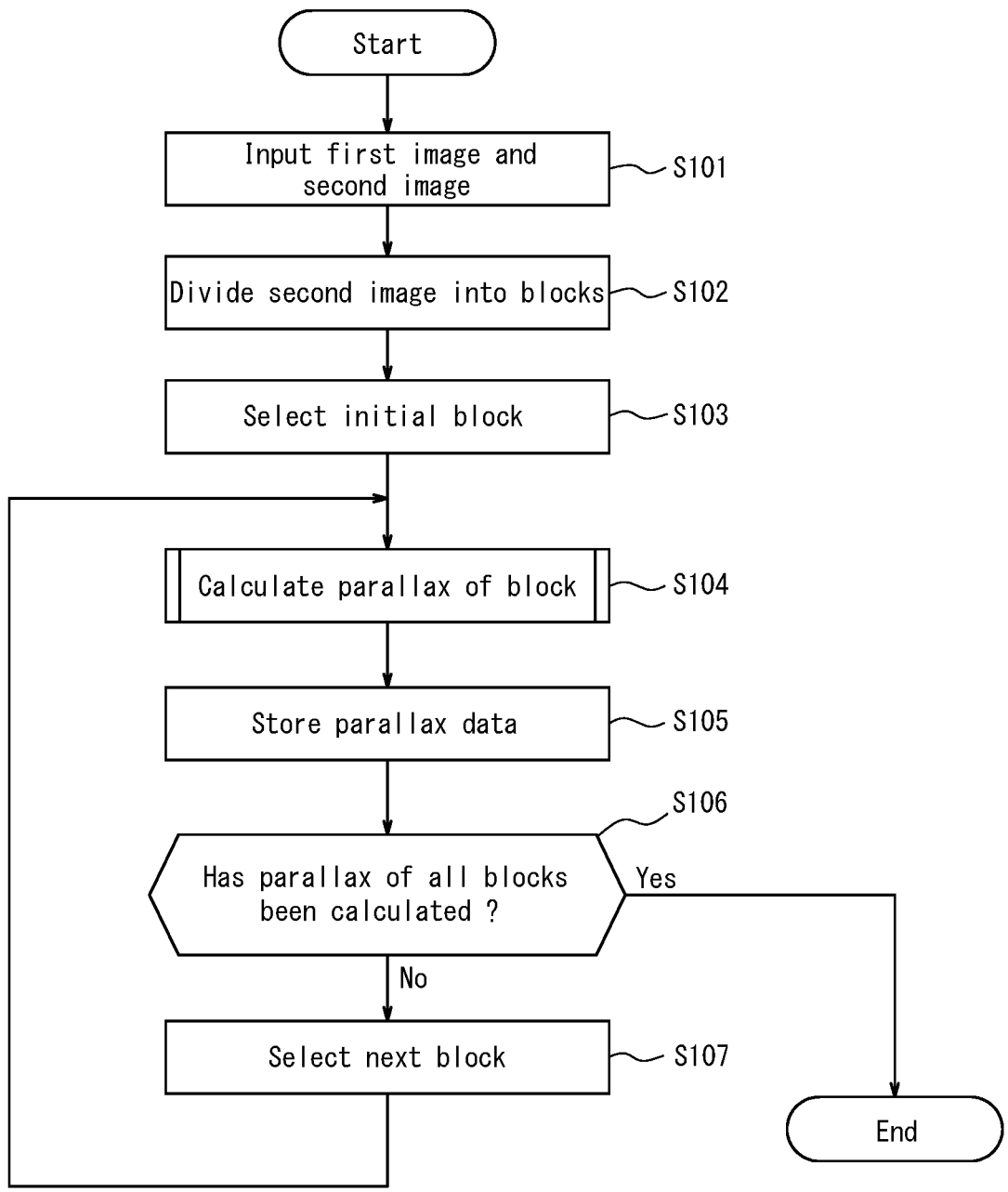
FIG. 3 is a flowchart illustrating the procedure for parallax calculation on a first image and a second image.
Figure 4:
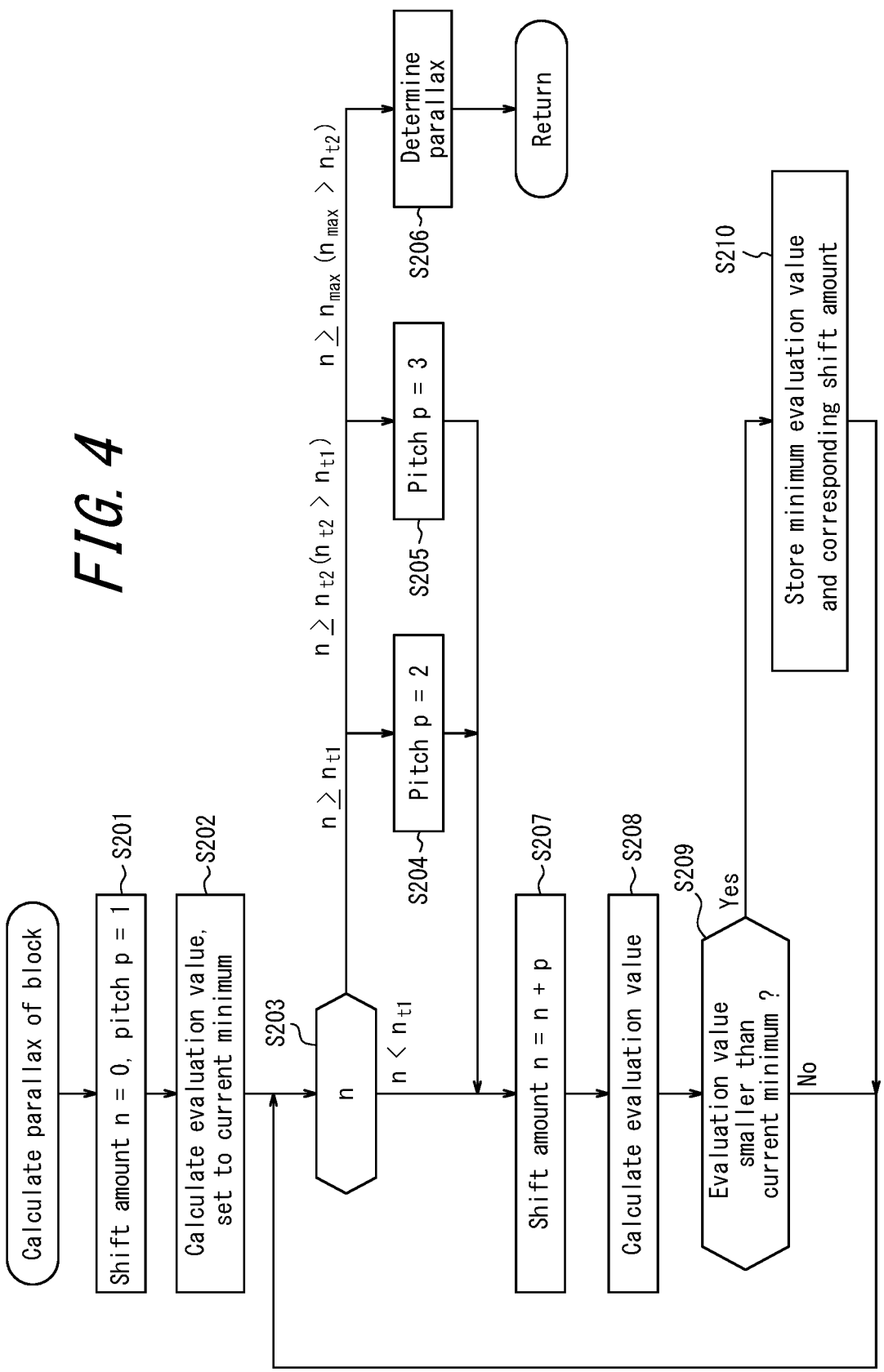
FIG. 4 is a flowchart illustrating the procedure for parallax calculation on one block.

With reference to the flowcharts in FIG. 3 and FIG. 4, a method by which the second calculator 21 calculates parallax between the first image and the second image is described. Parallax calculation is performed sequentially for each block in the flowcharts in FIG. 3, but the second calculator 21 may perform parallax calculation on a plurality of blocks in parallel.

First, the second calculator 21 receives the first image and the second image that were calibrated by the calibrator 19 (step S101). These images are stored in the second memory 18. The second calculator 21 sequentially acquires and uses portions of the image from each of the first image and the second image stored in the second memory 18 as necessary for the following processing.

Next, the second calculator 21 divides the second image into rectangular blocks in which pixels are arrayed horizontally and vertically (S102). The second calculator 21 may divide the entire second image. In the case of not calculating parallax for the upper and lower portions of the image, the second calculator 21 may instead divide a portion of the image excluding the areas where parallax is not to be calculated. The second calculator 21 can convert the processing to acquire a portion corresponding to the block from the second memory 18 to the processing to divide the image. The size of the blocks into which the second image is divided can be a predetermined size. The size of the blocks may, for example, be 3×3 pixels, 5×5 pixels, 9×9 pixels, or the like. A different number of horizontal and vertical pixels may also be used to yield a block size of 3×5 pixels, 5×3 pixels, 5×9 pixels, 9×5 pixels, or the like. A small block size reduces the amount of information used and thus could degrade the accuracy of parallax calculation by the second calculator 21. A large block size increases the probability of subjects with different parallax being intermingled within the same block and thus could also degrade the accuracy of parallax calculation by the second calculator 21. The block size is preferably at least 3×3 and less than 10×10 pixels.

Next, the second calculator 21 selects a first block (step S103) and calculates the parallax by performing one-dimensional matching with the first image (step S104). Here, the first block is, for example, the block in the upper left corner of the second image. Any block, not only the block in the upper left corner, may be used as the first block. The second calculator 21 acquires, from the second memory 18, image data among the first image for a certain number of lines, corresponding to the size of the block, in a direction that crosses the baseline length direction. For example, for a block size of 3×3 pixels, the second calculator 21 acquires three lines of image data along the baseline length direction at the uppermost portion of the first image and the second image from the second memory 18. The second calculator 21 shifts the block of the second image sequentially from the left in the baseline length direction and performs one-dimensional matching with the first image.

Next, the method for calculating the parallax of the block is described with reference to the flowchart in FIG. 4, which illustrates the procedure for parallax calculation on one block.

First, the second calculator 21 sets the shift amount, n, to 0 and the pitch, p, to 1 in correspondence with the selected block (step S201). Here, the shift amount, n, represents the number of pixels by which the block of the second image has been shifted in the baseline length direction, which is the horizontal direction, relative to the pixel position of the first image. The pitch, p, indicates the number of pixels by which the block is to be shifted forward from the current pixel position of the block to the next pixel position over the first image. In other words, during subsequent processing with a shift amount, n, of 0 and a pitch, p, of 1, the second calculator 21 first compares the luminance of the pixels in the block of the second image with the luminance of the pixels at the same position on the first image. The position at which the shift amount, n, of the block is 0 is also referred to as the initial position. Next, the second calculator 21 shifts the block by one pixel, which is the magnitude of the pitch, p, and sets the shift amount, n, to 1. The second calculator 21 then compares the luminance of the pixels in the block of the second image with the luminance of the pixels of the first image at the position shifted by one pixel. In this manner, the second calculator 21 sequentially shifts the block relative to the first image by the magnitude of the pitch, p.

Next, the second calculator 21 calculates an evaluation value for the shift amount, n, of 0 and sets the result as the current minimum evaluation value (step S202). The sum of absolute difference (SAD) can be used as an evaluation function to calculate the evaluation value. In this case, the second calculator 21 calculates the absolute value of the difference in luminance between the pixels in the block of the second image and the corresponding pixels in the first image for when the shift amount, n, of the block is 0. The second calculator 21 sums the calculated absolute value over all of the pixels in the block. A smaller evaluation value indicates better matching between the block of the second image and the first image. The second calculator 21 may use a different evaluation function than SAD.

Figure 5A:
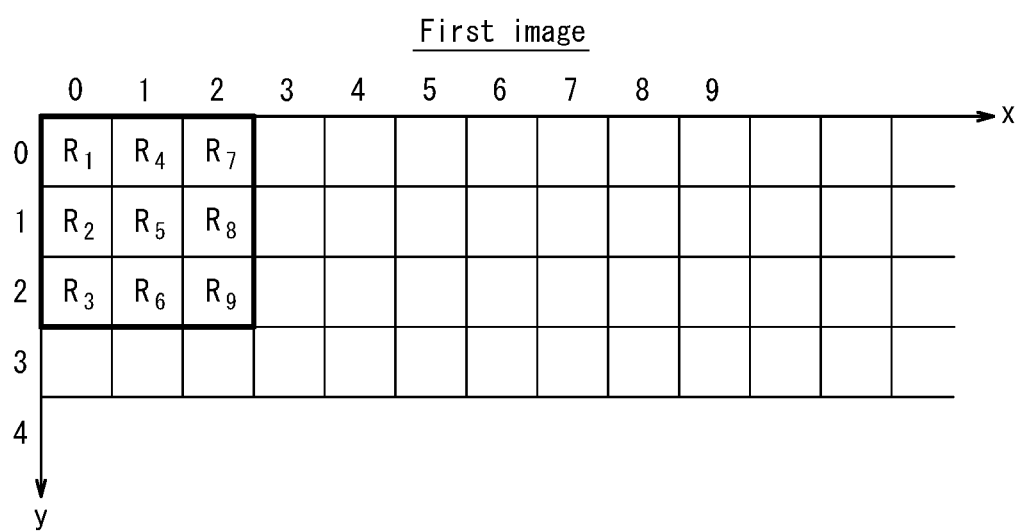
FIG. 5A illustrates an example of a block of the second image.

Matching of the block of the second image to the first image is further described with reference to FIG. 5A and FIG. 5B. First, as illustrated in FIG. 5A, the block divided from the second image is assumed to constitute three rows by three columns of pixels ($R_1$ to $R_9$). In the present embodiment, the second camera 11b positioned to the right when looking in the subject direction outputs the second image. Therefore, the same subject imaged by the second camera 11b in the second image is positioned further to the right in the first image of the first camera 11a, which is positioned to the left. Hence, the second calculator 21 sequentially shifts a 3×3 pixel area of the same size as the block of the second image to the right over the first image from a position corresponding to the block of the second image. In this manner, the second calculator 21 sequentially extracts a 3×3 pixel area from the first image and calculates the evaluation function. In other words, the second calculator 21 shifts a window, W, with the same size as the block over the first image in the baseline length direction and performs matching between the luminance of the pixels of the first image in the window W and the luminance of the pixels in the block of the second image. Performing one-dimensional matching by sequentially shifting a block of the second image in the baseline length direction refers to this sort of matching.

Figure 5B:
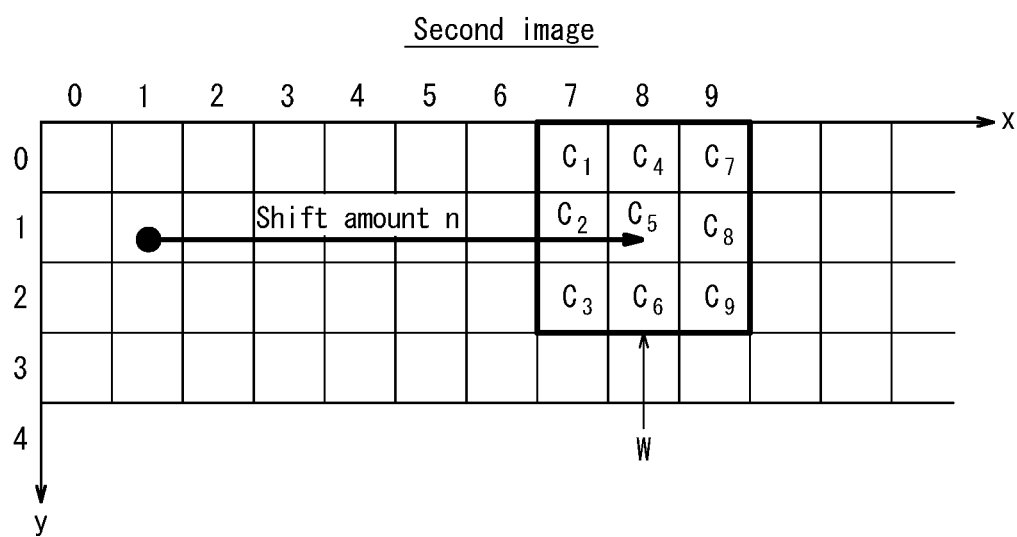
FIG. 5B illustrates matching the block of the second image to the first image.

FIG. 5B illustrates the case of the shift amount, n, being seven. The evaluation value SAD is obtained by the following equation, where the three rows by three columns of pixels in the window, W, are $C_1$ to $C_9$.

$$SAD = \Sigma |R_i - C_i| \qquad (2)$$

Here, $R_i$ and $C_i$ respectively indicate the luminance of the $i^{th}$ pixel in the block of the second image and the $i^{th}$ pixel in the window, W, of the first image. The symbol represents the sum from i=1 to 9.

Returning to the flowchart in FIG. 4, in the subsequent processing, the second calculator 21 repeatedly calculates the evaluation value while sequentially increasing the shift amount, n, in accordance with the pitch, p. At this time, the magnitude of the pitch, p, changes in accordance with the shift amount, n (step S203). Given predetermined values $n_{t1}$, $n_{t2}$, and $n_{max}$ ($n_{max} > n_{t2} > n_{t1}$), when $n < n_{t1}$ in step S203, the second calculator 21 leaves the pitch, p, at one. When $n_{t1} \leq n < n_{t2}$, the second calculator 21 sets the pitch, p, to two (step S204). When $n_{t2} \leq n < n_{max}$, the second calculator 21 sets the pitch, p, to three (step S205). When $n_{max} \leq n$, the second calculator 21 terminates the block matching and determines the parallax (step S206). Here, $n_{max}$ is the maximum value by which to shift the block of the second image and corresponds to the smallest distance that can be calculated in a stereo image. The value of $n_{max}$ can be set to approximately 50 to 100 pixels. The predetermined values relative to the shift amount, n, are not limited to the three values $n_{t1}$, $n_{t2}$, and $n_{max}$.

The magnitude of the pitch, p, for shifting the block can be set equal to or less than the width of the block in the baseline length direction. For a block size of 3×3 pixels, the magnitude of the pitch, p, is a maximum of three pixels. In this case, a larger pitch, p, than three pixels would increase the probability of the minimum evaluation value not being calculated correctly.

The second calculator 21 increases the shift amount, n, by the pitch, p, except for the case of branching to step S206 when $n_{max} \le n$ in step S203 (step S207). In other words, the second calculator 21 further shifts the block of the second image by the pitch, p, relative to the first image. The second calculator 21 then repeats the calculation of the evaluation value between the shifted block of the second image and the first image (step S208).

When the calculated evaluation value is smaller than the minimum evaluation value at that point (step S209), the second calculator 21 updates the minimum evaluation value to the newly calculated evaluation value. Furthermore, the second calculator 21 stores the shift amount, n, corresponding to the minimum evaluation value (step S210). When the evaluation value is greater than the minimum evaluation value at that point, the second calculator 21 returns directly to step S203 and subsequently repeats the processing from step S203 to step S209 until $n \ge n_{max}$.

On the other hand, when $n_{max} \le n$ in step S203, the second calculator 21 determines that the shift amount, n, corresponding to the minimum evaluation value is the parallax of the block (step S206).

Next, returning to the flowchart in FIG. 3, the second calculator 21 stores the parallax determined in step S206 in the second memory 18 (step S105). The second calculator 21 sequentially selects the divided blocks from the second image (step S107) and repeats the parallax calculation (step S104) until the parallax of all of the blocks from the second block onward is calculated (step S106).

In this processing, the second calculator 21 first sequentially selects blocks, starting with the first block in the second image and moving to the right, and performs matching on the first three lines. Next, the second calculator 21 acquires the next three lines of image data of the first image and the second image from the second memory 18, where the number of lines is equivalent to the vertical number of pixels in a block. From this image data, the second calculator 21 selects blocks of 3×3 pixels in order from the left of the second image and calculates the parallax by performing matching with the first image. Subsequently, the second calculator 21 similarly acquires three lines of data at a time from the second memory 18 and calculates parallax sequentially.

After having calculated the parallax of all of the blocks (step S106), the second calculator 21 terminates the procedure for calculating parallax between the first image and the second image.

After having calculated the parallax of all of the blocks, the second calculator 21 outputs the parallax information, stored in the second memory 18, of all of the blocks for subsequent processing. For example, the stereo camera apparatus 10 can include an image processor that performs image processing other than parallax calculation, such as detection of obstacles in the stereo image. In this case, the second calculator 21 outputs the first image and the second image stored in the second memory 18 along with parallax information to the image processor. The image processor generates a distance image that indicates the distance to subjects on the basis of the parallax information and judges the distance, the relative speed, and the like to an object detected in the stereo image.

The second calculator 21 repeats execution of the aforementioned parallax detection procedure each time input of the first image and the second image is received from the stereo camera 11. Accordingly, the second calculator 21 calculates the parallax of all of the blocks faster than the frame rate of the stereo camera 11.

In the present embodiment, shifts are made at a different pitch, p, in accordance with the shift amount, n, as described with reference to the flowchart in FIG. 4. The pitch, p, in the present embodiment is greater for a large shift amount than for a small shift amount.

Figure 6A:
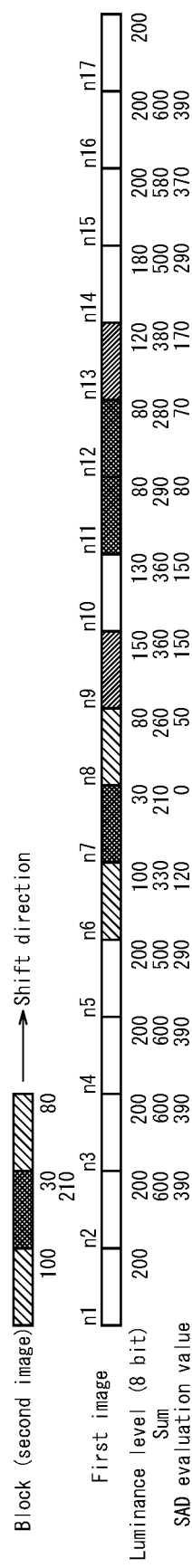
FIG. 6A illustrates an example of the luminance of each pixel in the first image and in a one-dimensional block of the second image.
Figure 6B:
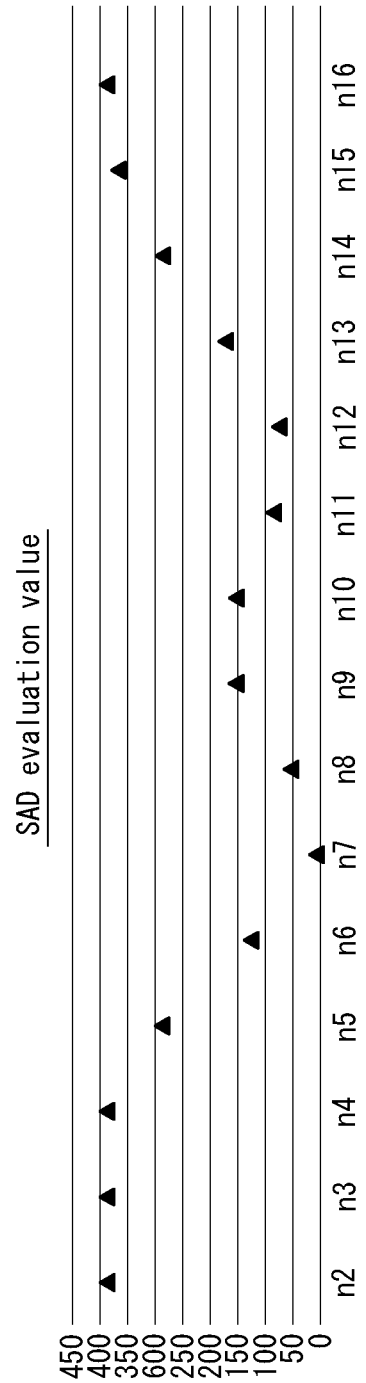
FIG. 6B illustrates the change in the evaluation value when a one-dimensional block is shifted one pixel at a time with a conventional technique.

Here, with reference to the examples in FIG. 6A, FIG. 6B, and FIG. 6C, the calculation method of the evaluation value by the second calculator 21 is described again. FIG. 6A, FIG. 6B, and FIG. 6C describe methods of parallax calculation (disparity calculation) using examples of one-dimensionally arrayed pixels. The value of the pitch, p, relative to the shift amount, n, differs from the example illustrated in the flowchart in FIG. 4.

For the sake of illustration, FIG. 6A simplifies a block of the second image to three horizontally arrayed pixels. The luminance values of the pixels in the block are 100, 30, and 80, as illustrated by the numerical values in FIG. 6A. The sum of the luminance values of the pixels in the block is 210, as listed in the second line below the central pixel. On the other hand, n1 to n17 indicate pixels in the first image. The first line below each pixel indicates the luminance value of the respective pixel. The second line below each pixel in the first image indicates the sum of the luminance values of a total of three pixels: the respective pixel, and the pixel on either side. For example, for n6, the number 330 in the second line below n6 indicates the total of the luminance values 200, 100, 30 from n5 to n7. Furthermore, the third line below each pixel in the first image lists the evaluation value calculated by SAD when the pixel at the center of the block is shifted to the position of the respective pixel. The block of the second image is sequentially shifted from the left edge of the first image and compared.

The horizontal axis of the graph in FIG. 6B represents the pixels of the first image that match the central pixel in the block of the second image. In other words, the shift amount n is zero pixels for n2, one pixel for n3, two pixels for n4, and so forth. In this graph, the evaluation value is smallest for n7 along the horizontal axis, i.e. for a shift of five pixels. Hence, the parallax is five pixels.

In an example according to a conventional technique, the pitch at which the block is shifted is always a constant value of one pixel, regardless of the shift amount of the block, as illustrated in FIG. 6B. However, in a stereo image, the parallax is greater and the change in distance relative to a change in parallax is smaller as the distance decreases. Furthermore, the parallax is smaller and the change in distance relative to a change in parallax is greater as the distance increases. Therefore, at the short distance side where the parallax is large, increasing the pitch p during one-dimensional matching does not cause the distance resolution per one pixel of parallax (pixel resolution) to degrade as much as at the far distance side. Therefore, as compared to shifting one pixel at a time, the evaluation value calculation in FIG. 6C is performed by thinning out the shift amounts at which one-dimensional matching is performed (evaluation points) at the short distance side (the side with large shift amounts). Specifically, in FIG. 6C, calculation of n6, n9, n10, n12, n13, n15, and n16 is omitted. This example still yields a minimum SAD at n7, despite thinning out the evaluation points at which one-dimensional matching is performed at the short distance side.

In the above explanation, the second calculator 21 performed one-dimensional matching by shifting the block from one to several pixels at a time and then set the shift amount, n, with the smallest evaluation value as the parallax. However, the second calculator 21 can calculate the shift amount at which the evaluation value is minimized in units smaller than one pixel by interpolation on the basis of the relationship between the shift amount, n, and the change in the evaluation value. For example, the second calculator 21 can calculate the shift amount in units of subpixels with a method such as three-point fitting on the basis of the shift amount, n, at which the evaluation value is minimized along with data for the shift amounts and the evaluation values of the evaluation points on either side. In this manner, the second calculator 21 can calculate the parallax in smaller units.

Next, the way in which the present embodiment allows measurement of parallax up to a short distance while suppressing an increase in the processing load for parallax calculation is described with reference to FIG. 7 and FIG. 8.

Figure 7:
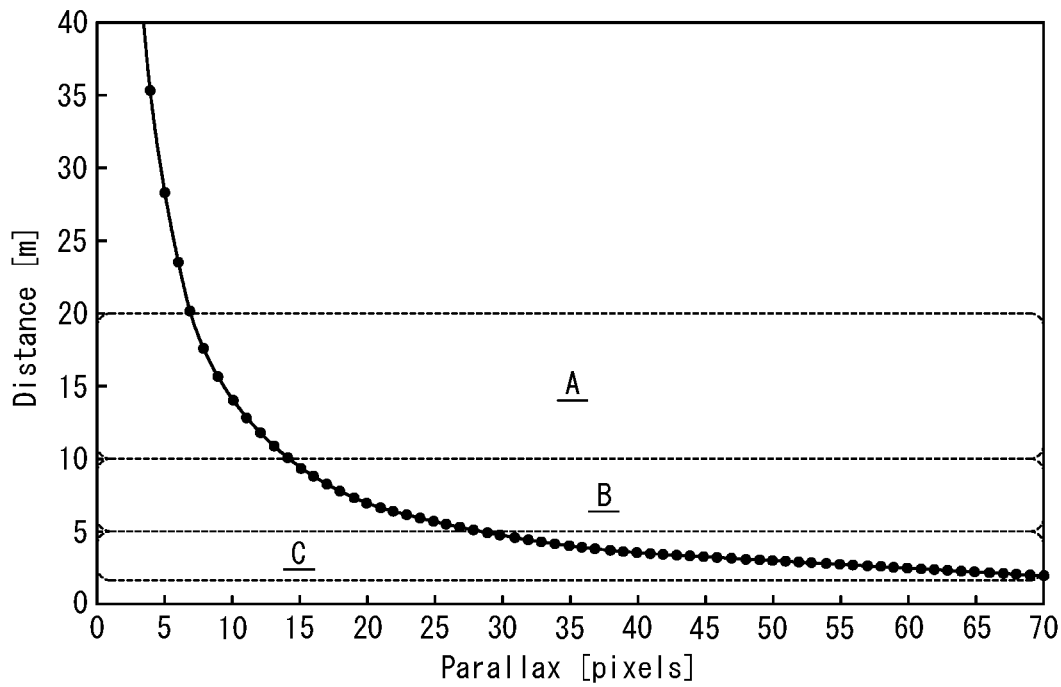
FIG. 7 illustrates the relationship between parallax (pixel) and distance when calculating the parallax by shifting the block one pixel at a time with a conventional technique.

The points on the graph in FIG. 7 indicate evaluation points at which evaluation by SAD is performed in accordance with a conventional example. In the measurement example illustrated in FIG. 7, the evaluation value is calculated by SAD up to the maximum shift amount $n_{max}=70$ for each block in order to measure from a far distance up to a short distance of approximately 2 m. In other words, this measurement method calculates the evaluation value according to SAD while incrementing the shift amount, n, one at a time from 0 to 70. However, the distance corresponding to pixels with a parallax of zero to three is outside the edge of the graph and thus not displayed. FIG. 7 indicates that at the short distance side of 5 m or less, for example, the change in distance for a change in parallax of one pixel is smaller than at the far distance side.

Furthermore, in FIG. 7, eight evaluation points from 7 to 14 pixels correspond to a distance of 10 m to 20 m. Accordingly, in a distance range A of 10 m to 20 m, the average distance resolution is approximately 1.2 m. Similarly, approximately 15 evaluation points correspond to a distance range B of 5 m to 10 m, yielding a distance resolution of approximately 0.3 m. Approximately 40 evaluation points correspond to a distance range C of 2 m to 5 m, yielding a distance resolution of approximately 0.075 m. In applications for vehicles, a distance resolution in the order of several centimeters is rarely necessary, even at short distances. Accordingly, even if the resolution in a distance range of 2 m to 5 m is reduced, a problem is unlikely to arise.

Figure 8:
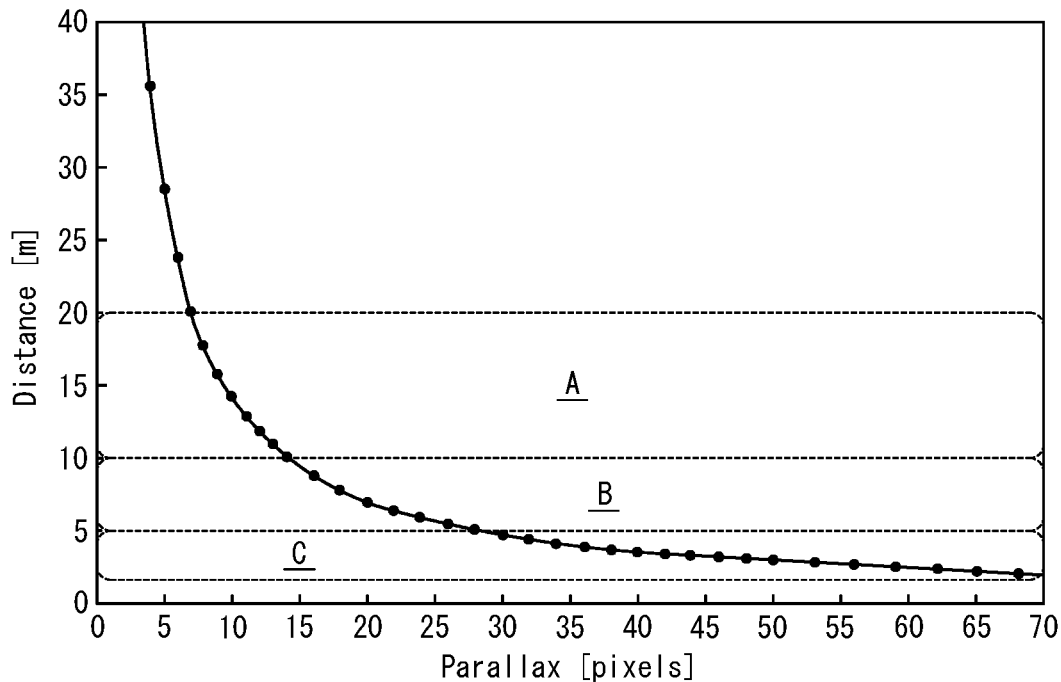
FIG. 8 illustrates the relationship between parallax (pixel) and distance when varying the pitch for shifting a block in accordance with the shift number of the pixel.

On the other hand, in an embodiment as illustrated in FIG. 8, the pitch, p, by which a block is shifted is varied in accordance with the shift amount of the pixel. The curve indicating the relationship between parallax and distance is the same in FIG. 8 and FIG. 7, but the number of evaluation points for measurement by shifting the blocks differs. With the method illustrated in FIG. 8, the parameters related to the shift, n, in the flowchart of FIG. 4 are set to $n_{t1}=14$, $n_{t2}=50$, and $n_{max}=70$. In other words, the shift amount, n, of a block is incremented one pixel at a time, at pitch p=1, up to 14 pixels. Upon the shift amount, n, exceeding 14 pixels, the pitch becomes p=2, and the block is shifted two pixels at a time. Furthermore, upon the shift amount, n, exceeding 50 pixels, the pitch becomes p=3, and the block is shifted three pixels at a time. Upon the shift amount, n, exceeding 70 pixels, one-dimensional matching terminates. As a result, the distance resolution in a distance range A of 10 m to 20 m is approximately 1.2 m, which is equivalent to FIG. 7. Furthermore, the evaluation value is calculated for seven evaluation points in the distance range B of 5 m to 10 m, yielding a distance resolution of approximately 0.7 m. The evaluation value is calculated for 15 evaluation points in the distance range C of 2 m to 5 m, yielding a distance resolution of approximately 0.2 m.

In this way, the distance resolution at the short distance side is higher than the distance resolution at the far distance side even when thinning out the evaluation points at which the evaluation value is calculated and increasing the pitch at the short distance side. Hence, the accuracy of distance measurement overall is hardly affected. Furthermore, the number of evaluation points at which the evaluation value is calculated by the SAD function, i.e. the number of different shift amounts, becomes 38, which is a nearly 50% reduction in the amount of calculation as compared to when shifting one pixel at a time up to 70 pixels, as in the conventional example illustrated in FIG. 7. Furthermore, since the evaluation point at a parallax of 38 pixels in FIG. 7 corresponds to a distance of approximately 4 m, the example in FIG. 8 according to the present embodiment allows measurement up to a short distance of approximately 2 m with the same amount of calculation as for measurement up to a short distance of approximately 4 m with the method in FIG. 7 according to a conventional technique.

As described above, the parallax calculation apparatus 12 of the present embodiment can measure parallax up to a short distance without increasing the processing load of the second calculator 21 of the controller 16. Furthermore, since the parallax calculation apparatus 12 does not use a method for calculating the parallax of a short-distance subject using the previous captured frame image, it can obtain the parallax regardless of the state in which the previous frame was captured or the previous result of parallax calculation. The parallax calculation apparatus 12 of the present embodiment also allows a reduction in the processing load of the second calculator 21 in the controller 16 by increasing the pitch, p, at the short distance side without changing the short distance measurement limit.

Figure 9:
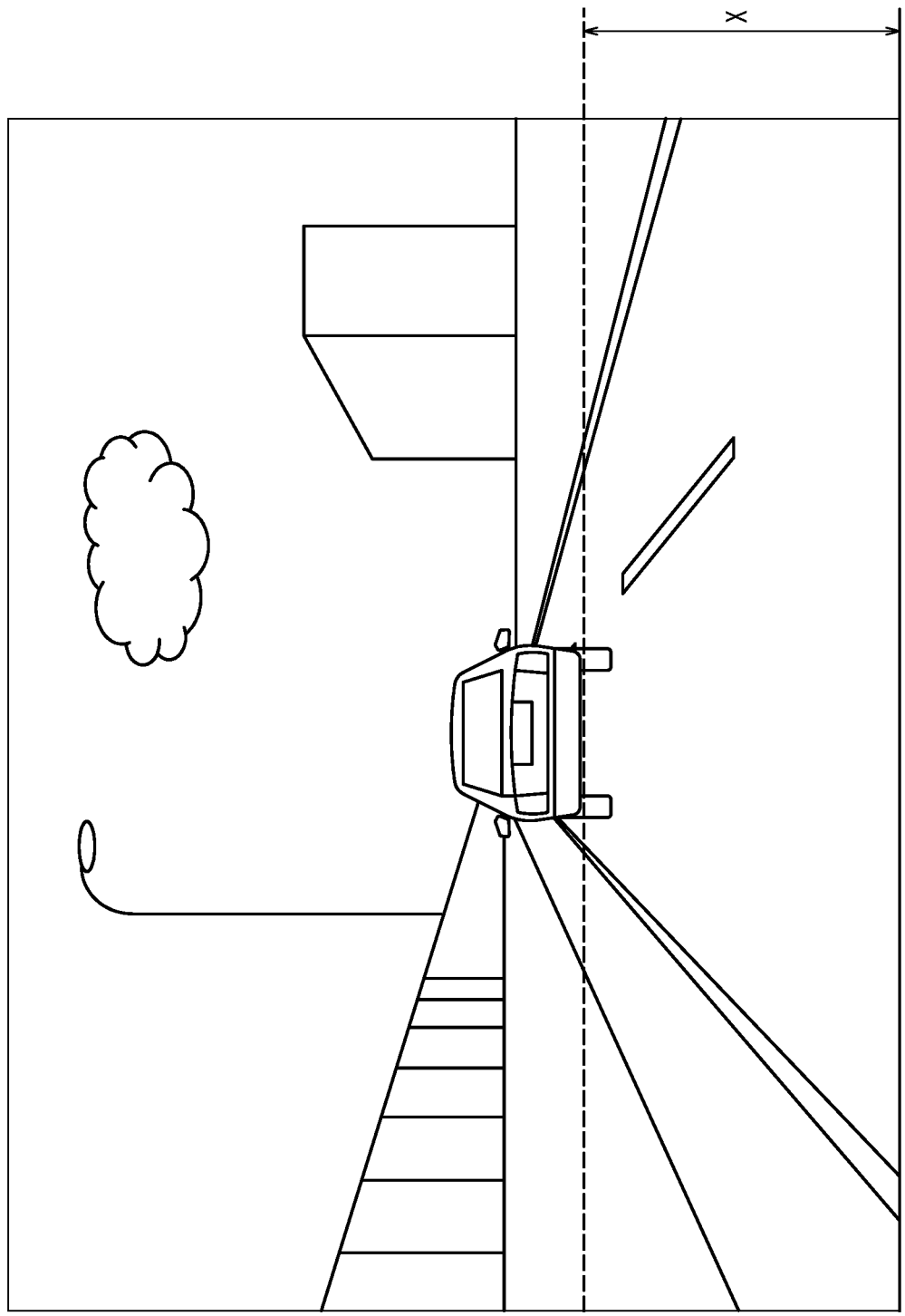
FIG. 9 illustrates a short distance area in the captured image in a modified example.

As described above, in addition to changing the pitch, p, for shifting the block in accordance with the magnitude of the shift amount, n, of the block, the second calculator 21 can include another condition in the parallax calculation method. In an embodiment, the second calculator 21 may establish a minimum value for the shift amount, n, of the block in accordance with the position in the vertical direction (the direction orthogonal to the baseline length direction) of the captured stereo image. FIG. 9 illustrates a first image or a second image captured while the vehicle is traveling. During horizontal travel, if the distance up to a portion X that is a certain height or less, as indicated by the dashed line in FIG. 9, is known to be 10 m or less, for example, the second calculator 21 may set the initial value of the shift amount, n, for the portion X accordingly. Specifically, in step S201 of the flowchart in FIG. 4, the second calculator 21 can set the initial value of the shift amount, n, to the number of pixels corresponding to a parallax of 10 m. This number of pixels is 15 in the case of FIG. 7 and FIG. 8.

By changing the minimum shift amount in this manner in accordance with the position in the vertical direction of the stereo image, the parallax calculation apparatus 12 can not only achieve the effects of the above embodiment but can also reduce the amount of calculation for calculating parallax.

Representative examples have been described in the above embodiment, but this disclosure is in no way limited to the above embodiment. A variety of modifications and changes to the above embodiment are possible within the spirit and scope of the present disclosure. For example, the way of changing the pitch, p, is only an example. The pitch, p, need not be an integer constant that is larger than one upon the shift amount exceeding a predetermined value, as in the flowchart of FIG. 4. For example, the second calculator may alternate between setting the pitch, p, to one pixel and two pixels depending on the distance range. Furthermore, the second calculator used the luminance of each pixel during one-dimensional matching between the second image and the first image, but the second calculator may perform matching using color information of each pixel instead. Furthermore, the present disclosure is not limited to applications for vehicles such as automobiles and may, for example, also be applied to modes of transport other than vehicles, or to surveillance cameras, camera apparatuses for monitoring production facilities, remotely controlled robots, and the like.

REFERENCE SIGNS LIST

1 Vehicle
10 Stereo camera apparatus
11 Stereo camera
11a First camera
11b Second camera
12 Parallax calculation apparatus
13 Road
14a, 14b White line
15 Input interface
16 Controller
17 First memory
18 Second memory
19 Calibrator
20 First calculator
21 Second calculator

The invention claimed is:

1. A parallax calculation apparatus comprising:
an input interface configured to acquire a stereo image including a first image and a second image; and
a controller configured to calculate parallax by performing sequential matching of a block that is a portion of the second image with the first image while sequentially shifting the block on the second image from an initial position to a first next position, and from the first next position to a second next position in a baseline length direction, wherein
the controller, while performing the sequential matching of the block, varies a pitch at which the block is shifted to each next position, in accordance with a shifted amount of the block from the initial position, and
the controller varies a minimum value of the shifted amount by which the block is shifted in accordance with a position of the block in a direction orthogonal to the baseline length direction.

2. The parallax calculation apparatus of claim 1, wherein the pitch at which the block is shifted is longer when the shifted amount of the block is large compared to when the shifted amount of the block is small.

3. The parallax calculation apparatus of claim 1, wherein the controller sets the pitch at which the block is shifted to be equal to or less than a width of the block in the baseline length direction.

4. The parallax calculation apparatus of claim 1, wherein the controller divides the second image into a plurality of areas, and the block is one area among the plurality of areas divided by the controller.

5. A stereo camera apparatus comprising:
a stereo camera; and
a parallax calculation apparatus comprising an input interface configured to acquire a stereo image including a first image and a second image captured by the stereo camera, and a controller configured to calculate parallax by performing sequential matching of a block that is a portion of the second image with the first image while sequentially shifting the block on the second image from an initial position to a first next position, and from the first next position to a second next position in a baseline length direction, wherein the controller varies, while performing the sequential matching of the block, a pitch at which the block is shifted to each next position, in accordance with a shifted amount of the block from the initial position, and
the controller varies a minimum value of the shifted amount by which the block is shifted in accordance with a position of the block in a direction orthogonal to the baseline length direction.

6. A vehicle comprising:
a stereo camera apparatus comprising a stereo camera and a parallax calculation apparatus, wherein the parallax calculation apparatus comprises an input interface configured to acquire a stereo image including a first image and a second image captured by the stereo camera and a controller configured to calculate parallax by performing sequential matching of a block that is a portion of the second image with the first image while sequentially shifting the block on the second image from an initial position to a first next position, and from the first next position to a second next position in a baseline length direction, wherein the controller varies, while performing the sequential matching of the block, a pitch at which the block is shifted to each next position, in accordance with a shifted amount of the block from the initial position, and
the controller varies a minimum value of the shifted amount by which the block is shifted in accordance with a position of the block in a direction orthogonal to the baseline length direction.

7. A parallax calculation method comprising:
acquiring a stereo image including a first image and a second image captured by a stereo camera; and
calculating parallax by performing sequential matching of a block that is a portion of the second image with the first image while sequentially shifting the block on the second image from an initial position to a first next position, and from the first next position to a second next position in a baseline length direction, wherein
a pitch at which the block is shifted to each next position, is varied, while performing the sequential matching of the block, in accordance with a shifted amount of the block from the initial position, and
a minimum value of the shifted amount by which the block is shifted in accordance with a position of the block in a direction orthogonal to the baseline length direction is varied.

* * * * *